Figure 5:
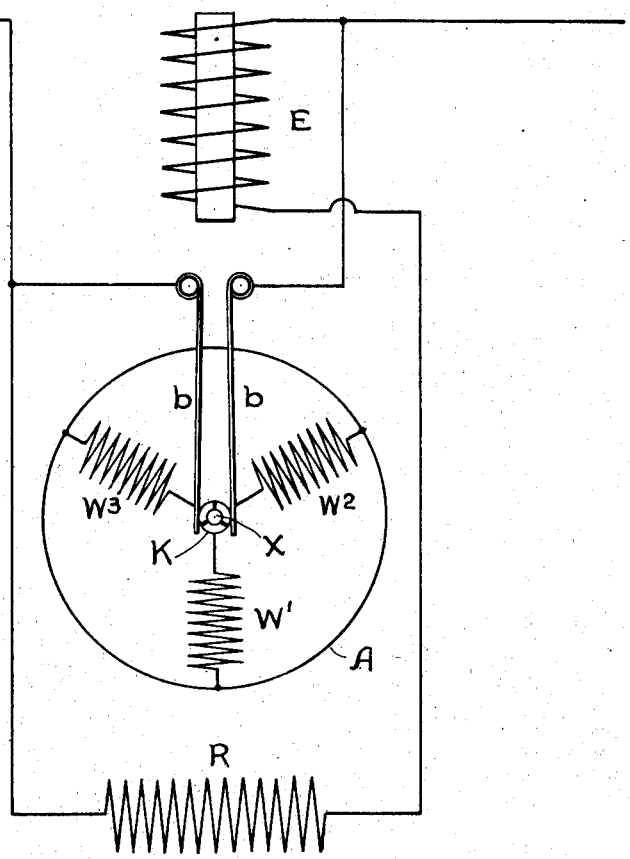

No. 706,612. Patented Aug. 12, 1902.
E. THOMSON.
ELECTRIC METER.
(Application filed Jan. 18, 1900.)
(No Model.) 3 Sheets—Sheet 1.
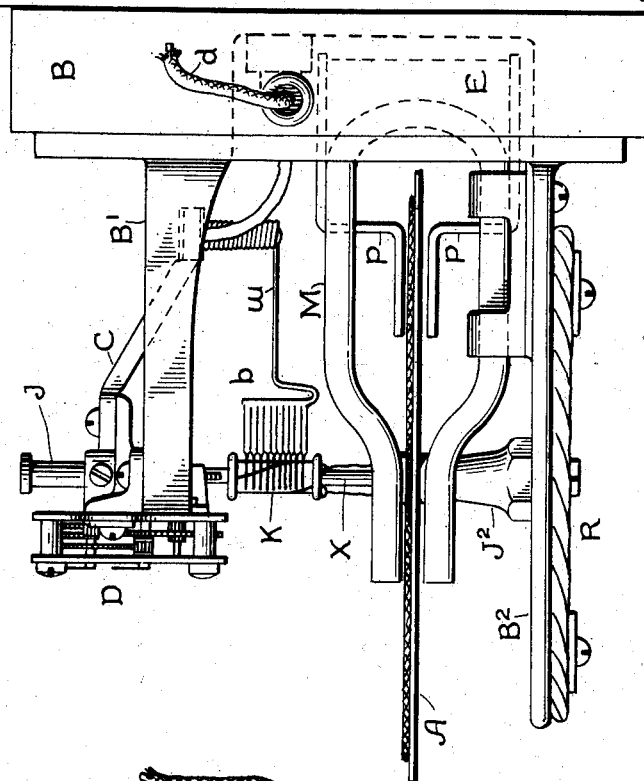
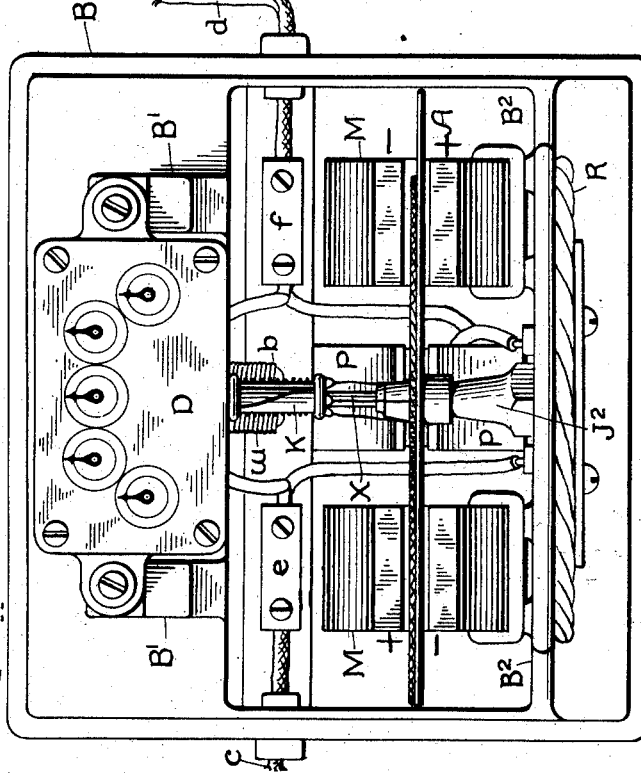
WITNESSES:
Rollin Abell
Dugald McKillop
INVENTOR:
Elihu Thomson
by
Abbott G. Davis
ATTY.

No. 706,612. Patented Aug. 12, 1902.
E. THOMSON.
ELECTRIC METER.
(Application filed Jan. 18, 1900.)
(No Model.) 3 Sheets—Sheet 2.
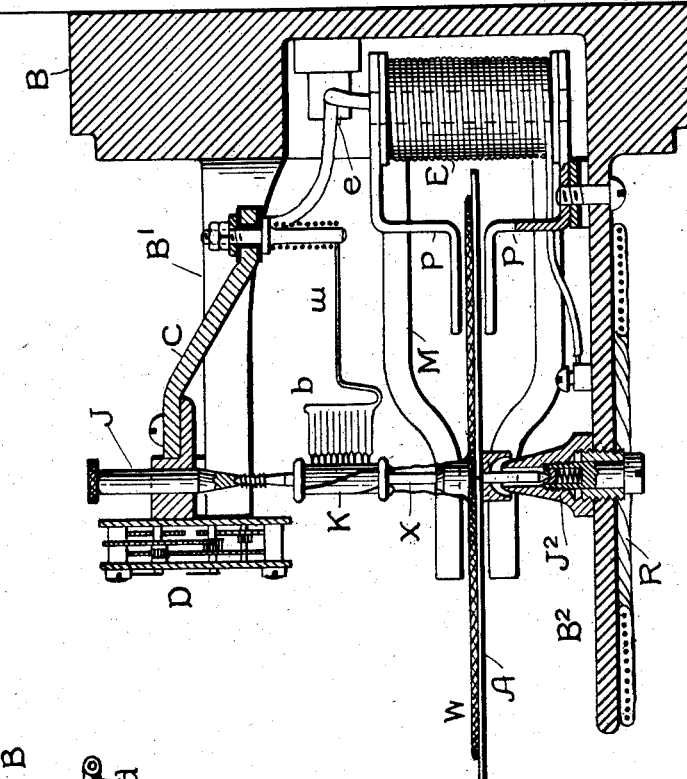
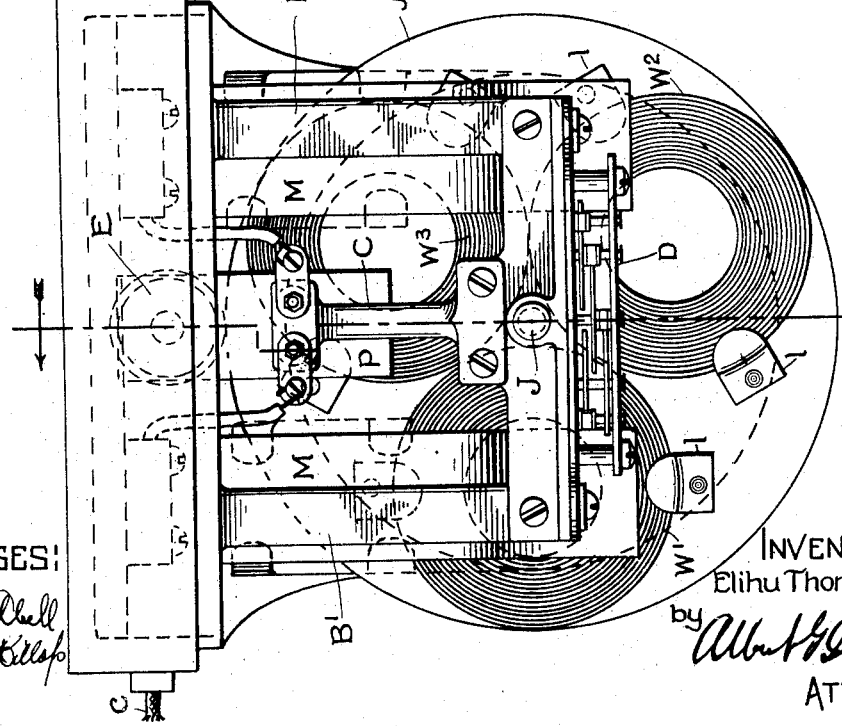
WITNESSES:
Rollin Abell
Dugald McKillop
INVENTOR:
Elihu Thomson.
by Albert G. Davis
ATTY.

No. 706,612. Patented Aug. 12, 1902.
E. THOMSON.
ELECTRIC METER.
(Application filed Jan. 18, 1900.)
(No Model.) 3 Sheets—Sheet 3.

WITNESSES:
Rollin Abell
Dugald McKillop

INVENTOR:
Elihu Thomson.
by Albert G. Davis
ATTY.

UNITED STATES PATENT OFFICE.

ELIHU THOMSON, OF SWAMPSCOTT, MASSACHUSETTS, ASSIGNOR TO THE GENERAL ELECTRIC COMPANY, A CORPORATION OF NEW YORK.

ELECTRIC METER.

SPECIFICATION forming part of Letters Patent No. 706,612, dated August 12, 1902.

Application filed January 18, 1900. Serial No. 1,848. (No model.)

*To all whom it may concern:*

Be it known that I, ELIHU THOMSON, a citizen of the United States, residing at Swampscott, county of Essex, State of Massachusetts, have invented certain new and useful Improvements in Electric Meters, (Case No. 1,483,) of which the following is a specification.

This invention relates to electric meters, the object being to simplify and cheapen the construction and render the operation of the meter uniform over all ranges of load. It is especially applicable to meters operating under direct current.

In carrying out the invention I provide a register driven by a meter-motor at a speed varying with the load on the consumer's circuit, in which the meter is installed in a manner usual with electric meters, and in order to simplify the construction I employ a motor comprising an armature or torque-producing element formed of a plurality of flat or "pancake" coils moving in a magnetic field of constant strength. The field may be excited in any desired manner; but I prefer for the sake of cheapness and convenience to employ one or more permanent magnets, between the poles of which the pancake-coils are mounted for rotation. As many such coils as desired may be employed and symmetrically disposed about the axis of rotation and supported in a common plane, to which the load-current of the consumer's translating devices is led through a suitable commutator. For cheapness of construction I prefer to employ a commutator formed of three segments and a corresponding number or multiple thereof of armature-coils. The small number of segments also permits the commutator to be made of small diameter, thus rendering brush-friction low. A type of commutator suitable for my purposes is that employed in the well-known Thomson-Houston three-coil dynamo for arc-lighting. In shunt to the armature is a resistance of such value as to take the maximum portion of the current flowing through the meter.

With an organization of the kind just outlined the effect of the friction of the moving parts is such that it is impossible to so adjust the meter that it will register the energy consumed with substantial accuracy both at low and at high loads. If the meter is so adjusted that its registration is accurate at the normal load for which the meter is constructed, there will be a considerable inaccuracy in the registration at very low loads, due to the fact that the friction of the moving parts, which is substantially constant at all speeds, becomes a greater proportional part of the load as the load on the meter decreases. The load due to the friction of the moving parts is, however, small in comparison with the load on the meter when full-load current is flowing in its actuating-windings. It is therefore possible to materially increase the accuracy of registration at low loads without decreasing by so great an amount the accuracy at full load by so adjusting the meter that its registration will be correct at some point intermediate between zero and full load, the particular point being determined in accordance with the range of load to which the meter is likely to be subjected. The meter when thus adjusted will of course register too low at low loads and too high at full loads; but its accuracy will on the whole have been substantially increased. It is not, however, possible by such an adjustment to make the registration accurate at all loads up to the full-load limit for which the meter has been designed.

I have found that it is possible to so modify the organization above specified that the registration of the meter may be made substantially accurate both at light loads and up to the maximum load for which the meter is designed, and it is one of the features of my present invention to provide such a meter with a corrective which will obviate the inaccuracies above referred to and will render the registration of the meter truly proportionate to the load on the circuit. In carrying out this feature of my invention I employ a retarding-magnet system comprising, in addition to the damper which slows down the speed of the meter-motor at all times, an auxiliary damper consisting of an electromagnet carrying a current varying with the load in the consumer-circuit and provided with an iron core so proportioned that its magnetization will be raised to or near the point of saturation as the meter-load approaches a maximum. The magnetization of this auxiliary damper is of course *nil* at zero load; but as the load comes on its damping tendency rapidly increases until when the load approaches a certain value, where the core of the electromagnet approaches saturation, the curve representing the retardation due to the auxiliary damper becomes flattened and the effect of the said damper thereafter substantially the same as that of a permanent magnet. With such a construction I so adjust the meter that it registers with substantial accuracy at full load when the core of the auxiliary damper is saturated. As the load falls off, that part of the retardation which is due to the auxiliary damper falls off at first slowly and later at an increasing rate as the magetization falls below the bend in the "curve of magetization," until finally when the load reaches its minimum value it become practically *nil*. By properly designing the electromagnet constituting the auxiliary damper its effect may be made to exactly compensate for the frictional resistance of the moving parts of the meter, so that the curve of registration will be substantially a straight line up to the maximum load for which the meter is designed, it being understood that beyond this load the curve of registration is likely to fall off somewhat, probably by reason of the disproportionate counterbalancing effect of the counter electromotive force generated in the meter-armature at such loads.

For convenience of construction I prefer to embody the damping-disk commonly employed in meters side by side with the armature-coils, permitting them to rotate in the same magnetic field. As will hereinafter be shown, however, such is not an absolutely essential arrangement of the parts and is adopted simply for compactness and convenience. So, also, the compensating device might be located in relation to another part of the rotating structure, but for the same reasons is preferably placed in coöperation with the combined armature and damping-disk.

The several features of novelty of my invention will be hereinafter more fully set forth, and will be definitely indicated in the claims.

Figure 6:
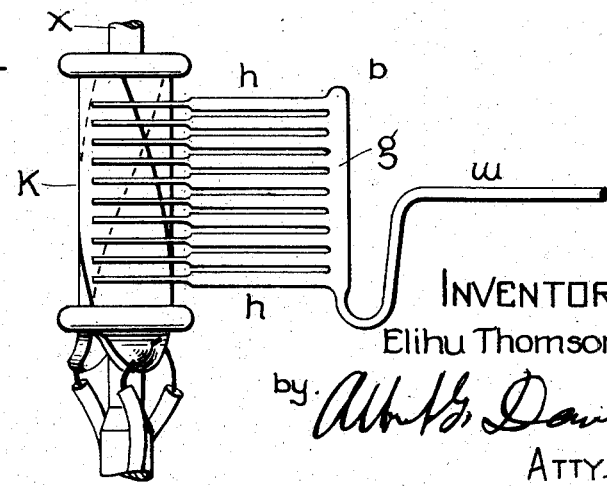

In the accompanying drawings, which illustrate my invention, Figure 1 is a side elevation of a meter embodying my improvements. Fig. 2 is an elevation on a plane at right angles to that indicated in Fig. 1. Fig. 3 is a vertical sectional view. Fig. 4 is a plan. Fig. 5 is a diagram of the operating-circuits, and Fig. 6 is a detail view of the commutator.

Referring first to Fig. 1, B represents a back or support, which may be formed of cast-iron, with suitable brackets or arms extending forward horizontally, as indicated at B' B². The upper bracket serves as a support for the upper end of the meter-shaft X and also carries the register or dial mechanism D, which may be operated in the usual way by worm-gearing with the motor-shaft. An arm C extends downward and backward, serving as a support for the commutator-brushes $b$, resting lightly on the commutator K, attached to the meter-shaft. Permanent magnets M M are carried upon the horizontal portion of the bracket B², in which also is mounted a support for the jewel-bearings for the bottom of the meter-shaft. The latter carries a metallic disk, preferably made of aluminium or copper, to act as a magnetic damper by reaction with the field-magnetism of the permanent magnets, between the poles of which it revolves. The shaft also carries a set of coils, which I prefer for compactness of construction to support upon the damping-disk, and which carry the operating-current for the meter. It will be evident, however, that with some other type of damper for the motor any other support for the armature-coils would serve as well. By examining Fig. 2 it will be seen that current enters the meter at $c$ and passes over a lead entering the meter through an insulated bushing, the wire being held by a clamp of insulating material $e$. A similar arrangement of the outgoing wire $d$ is made. From the blocks $e\ f$ connections are carried, respectively, to the commutator-brushes bearing on the commutator K, and parallel connections are led to a definite shunting resistance R, supported under the bracket B². This resistance is low relatively to the armature-circuit, so that but a small fraction of the total current flowing through the meter traverses the armature-coils, much the larger part passing through the resistance R.

The relative position of the parts will be better understood from Fig. 3. The upper support of the armature-shaft is seen at J, and the lower support is the usual meter-pivot or jewel-support seen at J². The lower end of the arm C carries an insulated bushing for the reception of two studs, each of which supports a commutator-brush, as at $b$. In order to give great delicacy and elasticity, the brushes are supported by the long wires $w$, wound around their studs so as to form a coil-spring, the springs being seen in vertical projection in Fig. 2. The upper end of this coil is secured to the stud on which it is mounted. By this arrangement the brush may be lifted off the commutator and carried away to a suitable distance for examination or adjustment without giving the parts a permanent set, thereby maintaining a uniform pressure upon the commutator. The armature-coils are seen in plan at W' W² W³, Fig. 4, constituted of pancake-coils of fine wire held to the disk by face-clamps $l\ l$, secured to the face of the disk. The coils are shown circular in outline, but may have any desired shape.

Any desired number may, of course, be employed and leads taken to a corresponding commutator; but I prefer the three-coil arrangement connecting the coils together at one set of terminals to a common lead and leading the free terminals to the several commutator-segments, as in the winding of the Thomson-Houston three-coil dynamo. The arrangement of the coils is indicated in diagram in Fig. 5 as a "star" connection. It will be evident, however, to those familiar with armature-windings that the "delta" form of construction, in which the armature-coils are connected in three sides of a triangle from the angles of which lead connections to the commutator-segments, might be employed with equal advantage. I prefer to make the commutator-segments with the joints inclined with respect to the axis of the commutator, so as to produce an overlapping of the brushes and lessen sparking in operation.

I prefer to arrange the field-magnets M M so that one will have a north pole uppermost and the other a south pole uppermost, an arrangement of polarities which affords the advantage of constituting almost an astatic combination, which stray fields will not affect so as to vary the rate of registration. This arrangement is indicated by the signs + and —, adjacent to the magnet-poles, in Fig. 2 of the drawings. While this arrangement is preferable, it is of course by no means essential to the successful operation of the meter.

In order to compensate for the tendency of the meter to run faster than it should on high loads when it is adjusted to register accurately on low loads, or, looking at the matter from another point of view, in order to compensate for the tendency of the meter to run slower than it should on low loads when it is adjusted to register accurately on high loads, I employ an auxiliary electromagnet E, the winding of which is of coarse wire, and preferably insert it in series with the resistance R. This is not, however, absolutely essential, as it might be in the armature branch. This magnet is provided with extended iron poles embracing the disk A or other disk mounted on the shaft X, which poles are indicated at P P. Its core is made of restricted dimensions, so that as the load increases it shall reach saturation or closely approach saturation.

The construction of the commutator and the commutator-brushes is shown in detail in Fig. 6. The engaging parts are made of pure silver, the armature-coils being soldered to the ends of the silver segments. The brush-carrying wire $w$, as shown, is bent at its end, and a number of comparatively small wires of pure silver are soldered to the support $g$ fixed to it. The wires are flattened at the portions $h\ h$ between the commutator and the support $g$ for the purpose of greatly increasing their flexibility and making each of the contacts substantially independently elastic. The wires should bear upon the commutator with as little pressure as is consistent with certainty of contact. They are therefore made thinner and more flexible than the brush-carrying wire or arm to which they are attached, and for the purpose of insuring a good contact by independent action a number of wires are employed. The drop of potential over the resistance R may be not more than one-twentieth of a volt for the smallest loads, and hence contact with the commutator should be as perfect as is possible without the production of undue friction.

In operation a certain proportion of the current flowing through the meter is diverted by the resistance R through the armature-coils, which are acted on by the field-magnets, setting up a rotation fast or slow, according to the amperage of the current, which of course varies with the number of translating devices in use. This action will be faster the more translating devices are being used, but not in a true proportion, for the reason that at the smallest load friction counts heavily and causes excess of retardation. At heavier loads the meter takes too high a rate, while at excessive loads it tends again to go at a lower than proper proportionate rate, probably because of the counter electromotive force of the armature reducing the current in it. I provide, however, as indicated above, a compensating agent for this disproportionate registration.

The operation of the retarding-magnet system comprises the permanent magnets M M, and the electromagnet E is when the meter is operating at full load and the core of the electromagnet E saturated exactly the same as if all the magnets were permanently magnetized. As the load falls off, however, the magnetization of the core of the electromagnet E decreases, so that at any lower load the operation of the retarding-magnet system is the same as though a permanent-magnet system of less strength had been substituted for the one employed at the higher load. The retarding effect of the retarding-magnet system is thus caused to fall off faster than the load, and the meter-armature is thus permitted at light loads to run enough faster than it otherwise would to give a substantially accurate registration, or, looking at the matter from another point of view, the retarding effect of the electromagnet E is practically *nil* at minimum load on account of the small current traversing its windings, thus permitting the meter to run faster than it would if the retarding-magnet E were a permanent magnet. As the load increases it becomes stronger and holds down the rate by acting as an auxiliary damper to the magnets M M, and as the load is still further increased the saturation of the core lowers the rate of increase of the damping effect. Thus the magnet from its peculiarities of action affords an efficient compensation for the structural errors of the meter. The poles P P of the magnet E should be placed over such a portion of the disk as will correspond to substantial neutrality in rotating effect on the disk—as, for example, on the diameter at right angles, or substantially so, with the diameter connecting the centers of the poles of the magnets M M. The effect of an organization of the kind just described is to produce a registration which is substantially in direct proportion to the load from minimum to maximum loads.

What I claim as new, and desire to secure by Letters Patent of the United States, is—

1. In an electric meter, a retarding-magnet system, the magnetization of which gradually increases with the load on the meter up to a certain point and thereafter remains substantially constant.

2. In an electric meter, a retarding-magnet system comprising one or more permanent magnets producing a constant magnetization, and an electromagnet having its windings supplied with a current which varies with the load on the meter.

3. In an electric meter, a retarding-magnet system, comprising one or more magnets producing a substantially constant magnetization, and an electromagnet, the magnetization of which is produced by a current which varies with the load on the meter, the said electromagnet being so calculated that it will become substantially saturated by the time that the meter-current rises to its full-load value.

4. In an electric meter, a retarding-magnet system comprising one or more magnets producing a substantially constant magnetization and an electromagnet, the winding of which is connected in the meter-circuit, the said magnet being so proportioned that at or near full load, its magnetization will become substantially constant.

5. In a retarding-magnet system for an electric meter, an electromagnet having its energizing-winding included in the meter-circuit, the said magnet being so proportioned that its magnetization will vary with the load on the meter up to a certain point and will therefore remain substantially constant.

6. In an electric motor-meter, a suitable retarding means in combination with means for increasing the effect of said retarding means at a rate which decreases as the load on the meter increases.

7. In an electric motor-meter, a retarding means, the effect of which is substantially constant, and an auxiliary retarding means, the effect of which increases with the load on the meter but at a constantly-diminishing rate.

8. In an electric motor-meter, a retarding means, the effect of which is substantially constant, and an auxiliary retarding means, the effect of which increases with the load on the meter up to a certain point and thereafter becomes substantially constant.

9. In an electric meter-motor having its armature shunted by a low resistance, a retarding-magnet system including an electromagnet connected in the low-resistance shunt and wound for saturation at heavy loads.

10. An electric meter composed of a register, a meter-motor, and a retarding-magnet wound for saturation at heavy loads.

11. An electric meter comprising a register, a meter-motor, a damping device for slowing the motor, and a retarding-magnet wound for weak magnetization at low load, and saturation at heavy loads.

12. An electric meter comprising a register, a meter-motor having field-magnets of constant strength and an armature in the consumption-circuit, and a compensating retarding-magnet symmetrically located between the field-magnets, as described, wound for saturation at heavy loads.

13. A motor for an electric meter provided with a commutator-brush formed of a plurality of silver contacts thinner at their point of connection with the support than at the points of contact, for the purpose described.

14. In an electric meter, a commutator-brush comprising a comparatively long spring-pressed arm mounted upon a suitable pivot and terminating in a plurality of relatively small and independently elastic members thinner and more flexible than the arm to which they are attached, and adapted to suitably engage the commutator of the meter-armature.

15. A commutator-brush comprising a plurality of flexible and independently elastic members, and a spring-support for said members, the support being thicker and more inflexible than the members attached thereto.

16. A commutator-brush comprising a plurality of relatively small and independently elastic members, and a common support for said members consisting of a long arm thicker and more inflexible than the members attached thereto, and having its end coiled about a supporting-stud so as to form a spring.

17. A commutator-brush comprising a plurality of relatively small and independently elastic members, and a relatively large and long arm pivotally mounted at one end and constituting a common support for all of said members, the said arm being thicker and more inflexible than the members attached thereto.

18. A commutator-brush comprising a comparatively long supporting-arm, and a plurality of relatively small wires supported therefrom, the said wires being flattened for the purpose of increasing their flexibility and rendering them independently elastic.

19. A commutator-brush comprising a relatively thin portion made up of a plurality of independently elastic members and a relatively thick, heavy portion acting as a support for said members.

20. A commutator-brush comprising a relatively thin portion made up of a plurality of independently elastic members, and a thick, heavy arm, spring-supported at one end, acting as a support for the said members.

21. A commutator-brush comprising a relatively thin portion made up of a plurality of independently elastic members, and a relatively thick, heavy portion rotatably mounted and acting as a support for the said members.

In witness whereof I have hereunto set my hand this 13th day of January, 1900.

ELIHU THOMSON.

Witnesses:
DUGALD MCKILLOP,
ROBERT SHAND.